(12) United States Patent
Thousand et al.

(10) Patent No.: US 7,738,482 B2
(45) Date of Patent: Jun. 15, 2010

(54) APPARATUS AND METHOD FOR IMPLEMENTING A SUSPEND MODE IN AN ETHERNET-BASED COMMUNICATIONS SYSTEM

(75) Inventors: Richard G. Thousand, Ankeny, IA (US); Kevin T. Chan, Pasadena, CA (US); Kevin Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1411 days.

(21) Appl. No.: 10/986,666

(22) Filed: Nov. 12, 2004

(65) Prior Publication Data

US 2005/0105545 A1    May 19, 2005

Related U.S. Application Data

(60) Provisional application No. 60/520,313, filed on Nov. 17, 2003.

(51) Int. Cl.
*H04L 12/403* (2006.01)
(52) U.S. Cl. ...................................... 370/450; 370/459
(58) Field of Classification Search ................... None
See application file for complete search history.

(56) References Cited

U.S. PATENT DOCUMENTS 7,292,597 B2 * 11/2007 Mills et al. .................. 370/433
7,392,409 B2 * 6/2008 Tateyama ................... 713/310
2003/0165142 A1 * 9/2003 Mills et al. ............. 370/395.62
2004/0105467 A1 * 6/2004 Goodman ................... 370/910

* cited by examiner

*Primary Examiner*—Seema S Rao
*Assistant Examiner*—Rhonda Murphy
(74) *Attorney, Agent, or Firm*—Sterne, Kessler, Goldstein & Fox P.L.L.C.

(57) ABSTRACT

The present invention describes a communications system having a first link partner and a second link partner that are connected by a communications link having at least four pairs of conductors. According to IEEE Standard 802.3 (e.g. Ethernet) for 1000Base-T, a data link is maintained (in a period absent data transmission) by sending idle signals over four pairs of conductors of the cable to maintain a logical connection. This idle signal scheme is replaced with an alternate idle signaling scheme that uses only two pairs of conductors to maintain a logical connection and therefore can operate with using lower power. The other two pairs of conductors of the four pairs of conductors are unused to maintain a logical connection absent data transfer, and therefore can be used to implement a Suspend Mode of operation. During Suspend Mode, the physical layer of each link partner powers down unnecessary circuitry so as to operate in a low power environment. To initiate the Suspend Mode, idle signals are sent on one of the un-used pairs of the conductors mentioned above. To exit Suspend mode, idle signals are sent on respective conductors simultaneously.

18 Claims, 3 Drawing Sheets

APPARATUS AND METHOD FOR IMPLEMENTING A SUSPEND MODE IN AN ETHERNET-BASED COMMUNICATIONS SYSTEM

CROSS-REFERENCED TO RELATED APPLICATIONS

This application claims the benefit of U.S. Provisional Application No. 60/520,313, filed on Nov. 17, 2003, which is incorporated by reference herein in its entirety.

BACKGROUND OF THE INVENTION

1. Field of the Invention

The present invention generally relates to implementing a suspend mode in an Ethernet-based communications system.

2. Background Art

High speed data links transmit data from one location to another over transmission lines. IEEE Std 1394 ("Firewire") includes a provision for a "Suspend" mode. Suspend mode allows the two ends of a link to substantially reduce their power consumption, while maintaining a low level connection. In Suspend mode, neither end of a link can send data, but both ends remain aware of the other's presence. Therefore, any disconnection of the link can be detected. The two ends of the link can move from Suspend mode back to normal operation (passing data) more quickly than re-establishing a connection that has been fully disconnected.

IEEE Std. 802.3 ("Ethernet") contains no equivalent function. However, it would be desirable to have such a Suspend mode option in IEEE 802.3.

BRIEF SUMMARY OF THE PRESENT INVENTION

The present invention is directed to implementing a Suspend Mode in a communications link, for example an Ethernet communications system. The communications link includes a first link partner and a second link partner that are connected together by at least four pairs of conductors, namely A, B, C, D. The communications link normally utilizes only one of the conductor pairs (either A or B) for data transmission, and the other two pairs of conductors (C and D) are un-used for data transmission. The link partners send idle signals on one of the pairs (A or B), or both pairs A and B, to maintain an Active Mode for data transmission. When there is no data to transmit, one of the link partners sends idle signals on an un-used pair (C or D) to initiate a Suspend Mode. The idle signals on the normally un-used pair of transmission lines are recognized by both link partners to initiate the Suspend Mode, where one or more transmitters and receivers in each link partner are powered down in order to save power. The Suspend Mode is maintained by continuing to send the idle signals on the normally un-used pair of conductors (C or D). When one of the link partners is ready to transmit data, then the Suspend Mode is terminated by sending idle signals on one (or both) of the normally used pairs (A and B), and on one (or both) of the normally un-used pairs (C and D).

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

"S800BaseT" is a high speed data link that uses a physical layer (PHY) from IEEE Std. 802.3 to carry 1394 Firewall data. S800T is further described in U.S. patent application Ser. Nos. 10/748,290 and 10/882,389, all of which are incorporated herein by reference. Furthermore, the 802.3 Ethernet standard and the IEEE Std 1394 are incorporated by reference herein in their entirety.

As discussed above, the Suspend mode in IEEE 1394 allows the two ends of a link to substantially reduce their power consumption, while maintaining a low level connection. In Suspend mode, neither end of a link can send data, but both ends remain aware of the other's presence. There is no 1000BASE-T equivalent to "Suspend" mode in IEEE Std 802.3. However, as discussed above, this would be desirable. Even know the invention is described in terms of IEEE Std. 802.3, the invention is not limited to this application, and could be used for other applications as will be understood by those skilled in the arts.

Figure 1:
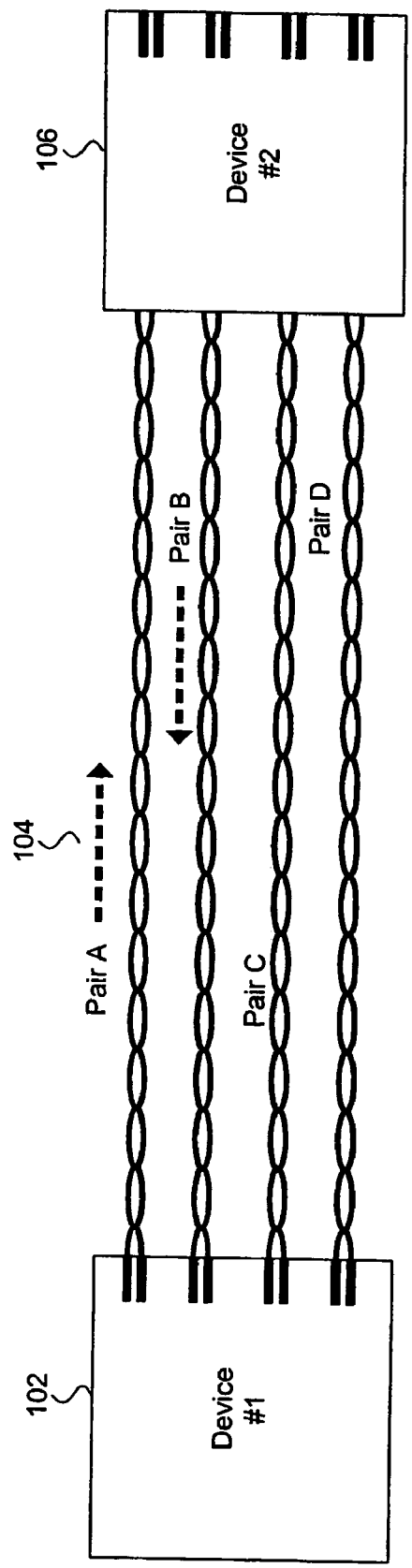
FIG. 1 illustrates a conventional communications link with four pairs of conductors (A, B, C, D), including at least one pair of conductors (C and D) that are not normally used for data transmission.

FIG. 1 illustrates a conventional S800Base-T communications system having four pairs of conductors 104, namely, pair A, pair B, pair C, and pair D. As shown, the 4 conductor pairs 104 connect a first link partner 102 to a second link partner 106. For Ethernet, the conductors could be twisted pair, but the invention is not limited to twisted pair, and could use other transmission line connections between the first and second link partners.

When a physical layer "LINK" is established in conventional S800Base-T, opposite ends are synchronized in a master/slave relationship. This is useful for proper cancellation of Near End Crosstalk (NEXT) and Far End Crosstalk (FEXT). Link start-up is based on values derived from auto-negotiation Next Pages. Link start-up time can be significant, as 1000BASE-T devices are allowed 750 ms after completion of auto-negotiation to establish a link.

According to IEEE Standard 802.3 (e.g. Ethernet), an Active Mode for data transmission is maintained by sending idle symbols when there is actually no data to transmit. In other words, a logical connection is maintained between link partners by the idle signals absent actual data transmission. In 802.3 10BASE-T, these idle symbols consist of normal link pulses ("NLPs") on a first pair or a second pair of conductors of the communications link. For example, the idle signals are sent on conductor pairs A or B of the four pair of conductors that are shown in FIG. 1. In 802.3 100BASE-TX, these idle symbol are higher speed MLT-3 idle code, also on a first pair or a second pair of conductors of the communications link. In 802.3 1000BASE-T, these idle symbols are higher speed PAM5 idle code, which is sent simultaneously on all four pairs at 125 MHz on each line. The IDLE pattern for 1000BASE-T consumes as much transmit power as data. Cessation of the IDLE pattern results in link drop, followed by restart of auto-negotiation. It can take several seconds to re-establish the link after a link drop.

The present invention includes a modified form of IEEE Std. 802.3 that enables a Suspend Mode to be implemented in 1000Base-T. In one embodiment of the invention, 1000Base-T is modified so that idle signals are transmitted only on the first and/or second pairs of the conductors 104, instead of all four pairs. This enables the other two pairs of conductors to be used for signal transitions and maintenance of a Suspend mode in IEEE 802.3 1000Base-T on the un-used conductor pairs.

Figure 2:
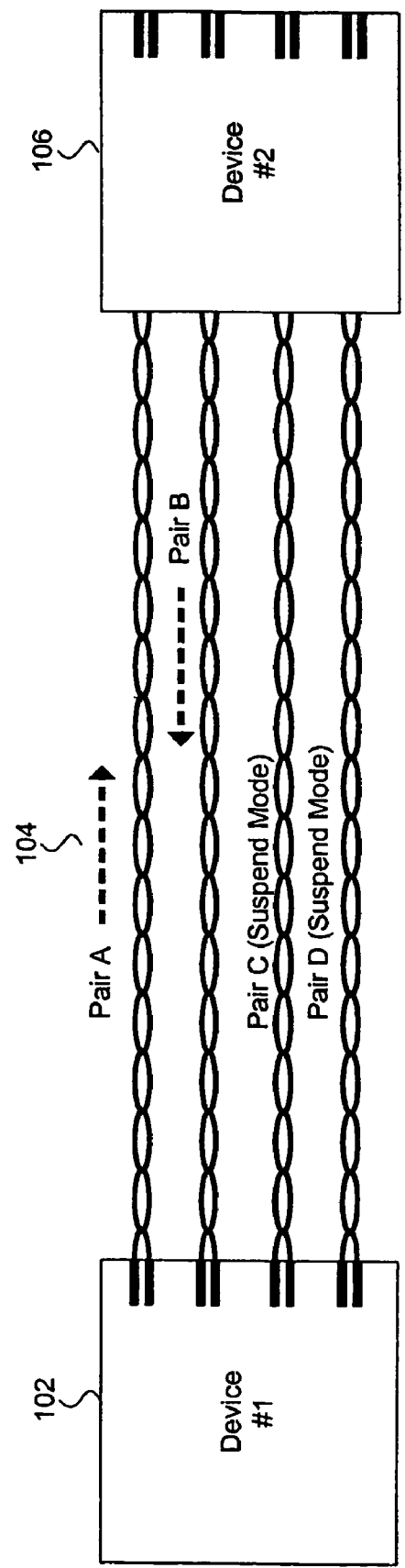
FIG. 2 illustrates a communications link with four conductors, where conductors C and D are used to initiate Suspend Mode.

For example, FIG. 2 illustrates that idle signals for IEEE Std. 1000Base-T are transmitted on conductors 1 and 2 (pair A), and/or on conductors 3 and 6 (pair B) to maintain a logical connection in Active Mode, absent any actual data transmission. The other two pairs of conductors (C and D) do not carry idle signals in Active Mode, and therefore are unused. Therefore, in one embodiment of the present invention, idle signals that are sent on the un-used conductor pairs C (conductors 4 and 5) and/or D (conductors 7 and 8) are interpreted to be signal transitions (including initiation) and maintenance of the Suspend Mode. Since the alternate pairs C and D are not examined in conventional 1000Base-T (or S800Base-T), such transitions and maintenance of the Suspend mode signals do not appear in any legacy 802.3 application.

Some unique signals are used to initiate a Suspend mode in order to transition from Active mode to Suspend mode. Furthermore, some unique signals are required to maintain the Suspend mode. Disconnection of the link is identified by the absence of the signal that causes the connection to be dropped. After a disconnection is detected, then the link can be restarted. The transition from Suspend mode back to Active mode also uses some unique signals to exit Suspend mode and get back to the Active state. In one embodiment, this requires some clock synchronization, but should not re-start Auto-negotiation. That is, suspend mode is not full disconnection. The signals for Suspend mode initiation and link re-activation are discussed further below in relation to FIG. 3.

Figure 3:
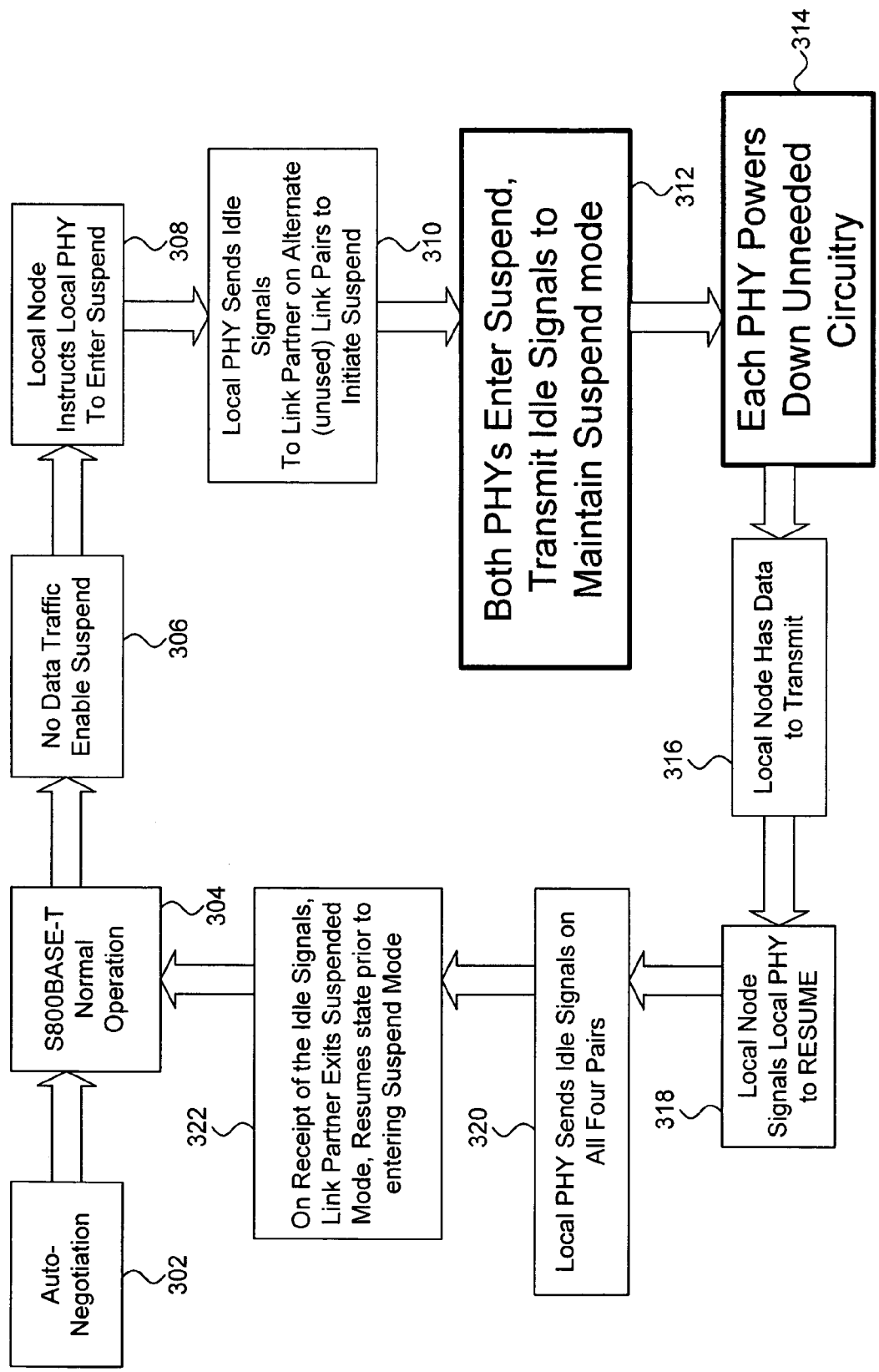
FIG. 3 illustrates a flowchart that describes initiation, maintenance, and exit of the Suspend Mode.

The initiation of the transition from Active mode to Suspend mode will now be discussed in reference to the flowchart 300 that is shown in FIG. 3. In step 302, auto-negotiation occurs between the PHYs of the link partners (e.g. link partners 102 and 106) to start data transfer. In step 304, normal data operation occurs to send data and idle signals between the link partners 102 and 106. In step 306, either link partner notices the absence of data traffic between the link partners for a specified time period, thus initiating the Suspend Mode. In step 308, one of the link partners instructs the local PHY to enter Suspend Mode based the on absence of data traffic. During initiation in step 310, the local PHY in the first link partner sends an idle signal pattern on conductor pairs C and/or D to the second link partner to initiate the Suspend Mode. These idle signals on pairs C and/or D are interpreted as Suspend Mode signals, since these pairs C and D are normally un-used for Active Mode idle signals in the modified version of IEEE 802.3 1000Base-T discussed above. Accordingly, the second link partner recognizes idle signals on pairs C and/or D as initiating Suspend Mode and responds with a similar transmission of idle signals on pairs C and/or D, so that both link partners enter the Suspend Mode.

During Suspend Mode, both PHYs in their corresponding link partners continue transmitting idle signals on the pairs C and/or D in step 312 so as to maintain the Suspend Mode. In step 314, each PHY powers down unneeded circuitry so that one or more transmitters and receivers are powered off. For example, three of the four transmitters and receivers can be powered off almost completely. For instance, the NEXT/FEXT cancellers, adaptive filters, and Analog-to-Digital Converters (ADCs) are powered off. Pads and signal detect functions remain powered up. By doing so, power is reduced by >80%, to <100 mW (although these results are implementation specific).

The Suspend mode enables detection of a physical disconnect between the first link partner and the second link partner. For instance, the Suspend mode enables detection when the cable is pulled out of the connector, or when a link partner loses power. If the cable is disconnected, or either link partner ceases functioning, then the idle signals on pairs C or D will cease. A PHY that no longer receives idle signals will disconnect and re-start the Auto-negotiation. Disconnection can be forced through software commands at either link partner, if it is desired to restart Auto-negotiation.

If either end of the link requires data to be sent, it can initiate an exit from the Suspend Mode, which is referred to as Resume Mode. In step 318, the local node signals the local PHY to enter Resume mode. In step 320 in Resume Mode, the PHY at either link partner sends idle signals on pairs C and/or D and simultaneously sends idle signals on pairs A and/or B. In step 322, the other end of the link receives the idle signals on all four conductor pairs simultaneously and recognizes this as an instruction to exit Suspend Mode. All parameters from the previous auto-negotiation state in step 302 are preserved. Both ends synchronize clocks, send PAM5 IDLE signals, and begin data transmission to re-enter normal operation in step 304. In one embodiment, this is identical to the steps following successful Auto-negotiation, where auto-negotiation is a start-up procedure.

Some of the advantages of the Suspend Mode are as follows. Entering and exiting Suspend mode enables low power operation when data is not being transmitted. Furthermore, the Suspend Mode keeps the physical connection active by sending the idle signals, and allows cable disconnects to be detected. The Suspend Mode leverages existing signaling levels and timing of idle signals. For instance, this allows 1000BASE-T PHY architecture to be used with only small modifications. This uses an alternate pair for idle signaling the Suspend mode, to prevent any confusion with idle signals sent during Active mode. Further, the Suspend Mode uses pairs C and D of a four pair conductor set, which are normally "unused" for all 802.3 Auto-negotiation and Link Pulse Signaling.

Although the invention is described in terms of IEEE Std. 802.3, the invention is not limited to this application, and could be used for other applications as will be understood by those skilled in the arts. Further, the invention is not limited to a communications link with four pairs of conductors. Instead, any number of conductors could be used, as long as one or more pairs of conductors are normally un-used for data transmission. Further, the invention is not limited to use with twisted pairs, but could be used with any type of transmission line.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A communications system, comprising:
   a first link partner;
   a second link partner; and
   a communications link between said first link partner and said second link partner that includes at least four pairs of conductors;
   wherein idle signals are sent on first and second pairs of conductors of said at least four pairs of conductors to maintain a logical connection in an Active Mode of said communications link;
   wherein idle signals are sent on third or fourth pairs of conductors of said at least four pairs of conductors to initiate a Suspend Mode of said communications link; and
   wherein said Suspend Mode is ended by sending idle signals on said first and second pairs of conductors, and simultaneously sending idle signals on said third and fourth pairs of conductors, as recognized by said first and second link partners.

2. The communications system of claim 1, wherein a physical layer in each of said first link partner and said second link partner powers-down circuitry during said Suspend Mode.

3. The communication link of claim 2, wherein said physical layer powers down a portion of a transmitter or a receiver in each of said first link partner and said second link partner during said Suspend Mode.

4. The communications link of claim 3, wherein at least one of a NEXT/FEXT canceller, an adaptive filter, and an Analog-to-Digital Converter (ADC) is powered down.

5. The communications link of claim 2, wherein said physical layer in each link partner includes one or more transmitters and one or more receivers, said physical layer in each link partner powering off all but one transmitter and one receiver.

6. The communications system of claim 1, wherein said communications link operates so that said third and fourth pairs of conductors are normally un-used during data transmission.

7. The communications system of claim 1, wherein said communications link is operating according to an IEEE 802.3 protocol.

8. The communications system of claim 1, wherein said communication link uses physical layers from IEEE Standard 802.3 to transmit data associated with an alternative protocol.

9. The communications system of claim 8, wherein said alternative protocol is IEEE Standard 1394.

10. In a communications system having multiple transmission lines connecting first and second link partners, at least one transmission line un-used for data transmission, a method of operating a Suspend Mode when no data traffic is flowing between said first and second link partners over said multiple transmission lines, the method comprising:
    sending idle signals on a first transmission line of said multiple transmission lines to maintain a logical link on said first transmission line;
    detecting an absence of data transfer between said first link partner and said second link partner on said first transmission line;
    sending idle signals on a second transmission line of said multiple transmission lines to initiate a Suspend Mode between said first link partner and said second link partner based on said absence of data transfer on said first transmission line, said second transmission line is un-used for data transfer; and
    resuming data transmission between said first link partner and said second link partner, including
       sending idle signals on both said first transmission line and said second transmission line to initiate a Resume Mode for data transfer; and
       resuming data transfer between said first link partner and said second link partner based on said Resume Mode.

11. The method of claim 10, further comprising the step of:
    powering down a portion of a transmitter and a receiver in each of said first link partner and said second link partner during said Suspend Mode.

12. The method of claim 11, wherein said first link partner and said second link partner each have a plurality of transmitters and receivers, further comprising the step of:
    at each link partner, powering down all but one transmitter and one receiver during said Suspend Mode.

13. The method of claim 11, further comprising the step of maintaining said Suspend Mode by continuing to send said idle signals between said first link partner and said second link partner over said second transmission line.

14. The method of claim 10, wherein said communications system operates according to IEEE Standard 802.3.

15. The method of claim 10, wherein said communication link uses physical layers from IEEE Standard 802.3 to transmit data associated with an alternative protocol.

16. The method of claim 15, wherein said alternative protocol is IEEE Standard 1394.

17. In a communications system having four pairs of conductors connecting first and second link partners, first and second pairs of said conductors used for data transmission and third and fourth pairs of said conductors un-used for data transmission, a method of operating a Suspend Mode when no data traffic is flowing between said first and second link partners over said first and second pairs of conductors, the method comprising:
    during an Active Mode, sending idle signals on either of said first and second pairs of conductors to maintain a logical connection;
    detecting an absence of data on said first and second pairs of conductors for a minimum time interval;
    sending idle signals on either one of said third and fourth pairs of conductors to initiate a Suspend Mode between said first link partner and said second link partner based on said absence of data on said first and second pairs of conductors; and
    if there is data to transmit between said first link partner and said second link partner, then sending idle signals on one of either said first and second pairs of conductors and sending idle signals on one of either said third and fourth pairs of conductors; and
    resuming data transfer upon receiving said idle signals on one of either said first and second pairs of conductors and upon receiving said idle signals on one of either said third and fourth pairs of conductors.

18. The method of claim 17, further comprising the steps of:
    powering down all but one transmitter and one receiver in each of said link partners during said Suspend Mode;
    sending idle signals over either said third or fourth pairs of conductors to initiate said Suspend Mode using said one transmitter and said one receiver in each link partner that is not powered down.

* * * * *